(12) United States Patent
Brewer et al.

(10) Patent No.: US 8,616,504 B2
(45) Date of Patent: Dec. 31, 2013

(54) ACTIVE GURNEY FLAP

(75) Inventors: Paul R. Brewer, Keynsham (GB);
Steven Shorcoll, Thrupp Stroud (GB);
Reg R. Raval, Yatton (GB)

(73) Assignee: Claverham Ltd., Bristol (GB)

( * ) Notice: Subject to any disclaimer, the term of this patent is extended or adjusted under 35 U.S.C. 154(b) by 92 days.

(21) Appl. No.: 13/449,749

(22) Filed: Apr. 18, 2012

(65) Prior Publication Data

US 2012/0261518 A1  Oct. 18, 2012

(30) Foreign Application Priority Data

Apr. 18, 2011 (EP) .................................. 11250480

(51) Int. Cl.
*B64C 3/50* (2006.01)
(52) U.S. Cl.
USPC ........................................... 244/215; 244/212
(58) Field of Classification Search
USPC ..................................... 244/215, 17.13, 12.1
See application file for complete search history.

(56) References Cited

U.S. PATENT DOCUMENTS

| | | | | |
|---|---|---|---|---|
| RE19,412 | E * | 1/1935 | Zaparka | 244/215 |
| 5,388,788 | A * | 2/1995 | Rudolph | 244/215 |
| 5,492,448 | A * | 2/1996 | Perry et al. | 416/62 |
| 5,518,210 | A | 5/1996 | Friberg | |
| 6,010,307 | A * | 1/2000 | McCabe | 416/237 |
| 6,030,179 | A * | 2/2000 | McCabe | 416/237 |
| 6,039,533 | A * | 3/2000 | McCabe | 415/146 |
| 6,132,181 | A * | 10/2000 | McCabe | 417/334 |
| 6,474,945 | B1 * | 11/2002 | Nakasato et al. | 416/23 |
| 6,565,045 | B1 * | 5/2003 | Correge et al. | 244/215 |
| 6,863,245 | B2 * | 3/2005 | Gessler et al. | 244/215 |
| 7,410,133 | B2 * | 8/2008 | Lee et al. | 244/215 |
| 7,740,205 | B1 * | 6/2010 | Nahas | 244/198 |
| 7,740,206 | B2 * | 6/2010 | Eaton et al. | 244/201 |
| 2007/0221789 | A1 * | 9/2007 | Lee et al. | 244/211 |
| 2009/0263252 | A1 * | 10/2009 | Slot | 416/223 R |
| 2009/0302167 | A1 * | 12/2009 | Desroche | 244/199.4 |
| 2010/0209258 | A1 * | 8/2010 | Fuglsang et al. | 416/90 R |
| 2010/0278657 | A1 * | 11/2010 | Kildegaard | 416/241 R |
| 2011/0164976 | A1 * | 7/2011 | Matalanis et al. | 416/1 |

FOREIGN PATENT DOCUMENTS

| | | |
|---|---|---|
| DE | 9113090 U1 | 1/1992 |
| DE | 102006036389 A1 | 4/2008 |
| EP | 0939029 A2 | 9/1999 |
| EP | 1085152 A2 | 3/2001 |
| EP | 1488998 A1 | 12/2004 |
| EP | 2316732 A2 | 5/2011 |
| FR | 2792285 A1 | 10/2000 |

OTHER PUBLICATIONS

Extended European Search Report for EP11250481 mailed Sep. 21, 2011.

(Continued)

*Primary Examiner* — Christopher P Ellis
*Assistant Examiner* — Medhat Badawi
(74) *Attorney, Agent, or Firm* — Carlson, Gaskey & Olds

(57) ABSTRACT

A gurney flap assembly has an actuator and a body. The body has a leading edge and a trailing edge and includes a first panel attaching to the actuator proximate the leading edge, and a second panel attaching to a first hinge at the trailing edge. A second hinge attaches the first and second panel. Linear motion of an actuator output is transposed to the gurney flap, thereby causing the gurney flap to expand and deploy into the airstream on the pressure side of the wing.

20 Claims, 4 Drawing Sheets

(56) References Cited

OTHER PUBLICATIONS

Extended European Search Report for EP 1250479 mailed Aug. 3, 2011.
US Patent ApplicationTitle: "Active Gurney Flap", U.S. Appl. No. 13/449,617, filed Apr. 18, 2012.
US Patent Application Title: "Active Gurney Flap". U.S. Appl. No. 13/449,909, filed Apr. 18, 2012.
Extended European Search Report for EP11250480 mailed on Sep. 21, 2011.

* cited by examiner

ACTIVE GURNEY FLAP

CROSS-REFERENCE TO RELATED APPLICATION

This application claims priority to European Application No. 11250480.8, filed Apr. 18, 2011.

BACKGROUND

This application relates to Gurney flaps and more particularly to active Gurney flaps.

A Gurney flap is a small flat tab projecting from a trailing edge area of a wing. Typically the Gurney flap is set at a right angle to the pressure side surface of the airfoil, and projects up to 2% of the wing chord. The chord wise position is typically 0.9 chord to the extreme trailing edge when measured from the leading edge. This trailing edge device will improve airfoil lift.

The Gurney flap operates by increasing pressure on the pressure side and may be used in auto racing, helicopter rotors, stabilizers, and aircraft wings where higher lift is required, such as high drag aircraft that take advantage of the resultant lift force.

The Gurney flap typically increases the drag coefficient, especially at low angles of attack, although for thick airfoils, a reduction in drag is known. A net benefit in overall lift to drag ratio is possible if the flap is sized appropriately based on the boundary layer thickness.

SUMMARY

According to an embodiment disclosed herein, a gurney flap assembly has an actuator and a body. The body has a leading edge and a trailing edge and includes a first panel attaching to the actuator proximate to the leading edge, and a second panel attaching to a first hinge at the trailing edge. A second hinge attaches the first and second panel.

According to a further embodiment disclosed herein, a gurney flap assembly in a rotary wing aircraft has a wing having a pressure side, a suction side, a trailing edge and a hollow portion between the pressure side and the suction side and adjacent the trailing edge. An actuator disposed within the hollow portion of the wing, and a body having, a forward edge and a aft edge, a first panel attaching to the actuator proximate to the forward edge, a second panel attaching to the aft edge, and a first hinge attaching the first and second panel, wherein the second panel flexes and the first hinge rotates in reaction to motion of the actuator.

Linear motion of an actuator output is transposed to the gurney flap, thereby causing the gurney flap to expand and deploy into the airstream on the pressure side of the wing.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
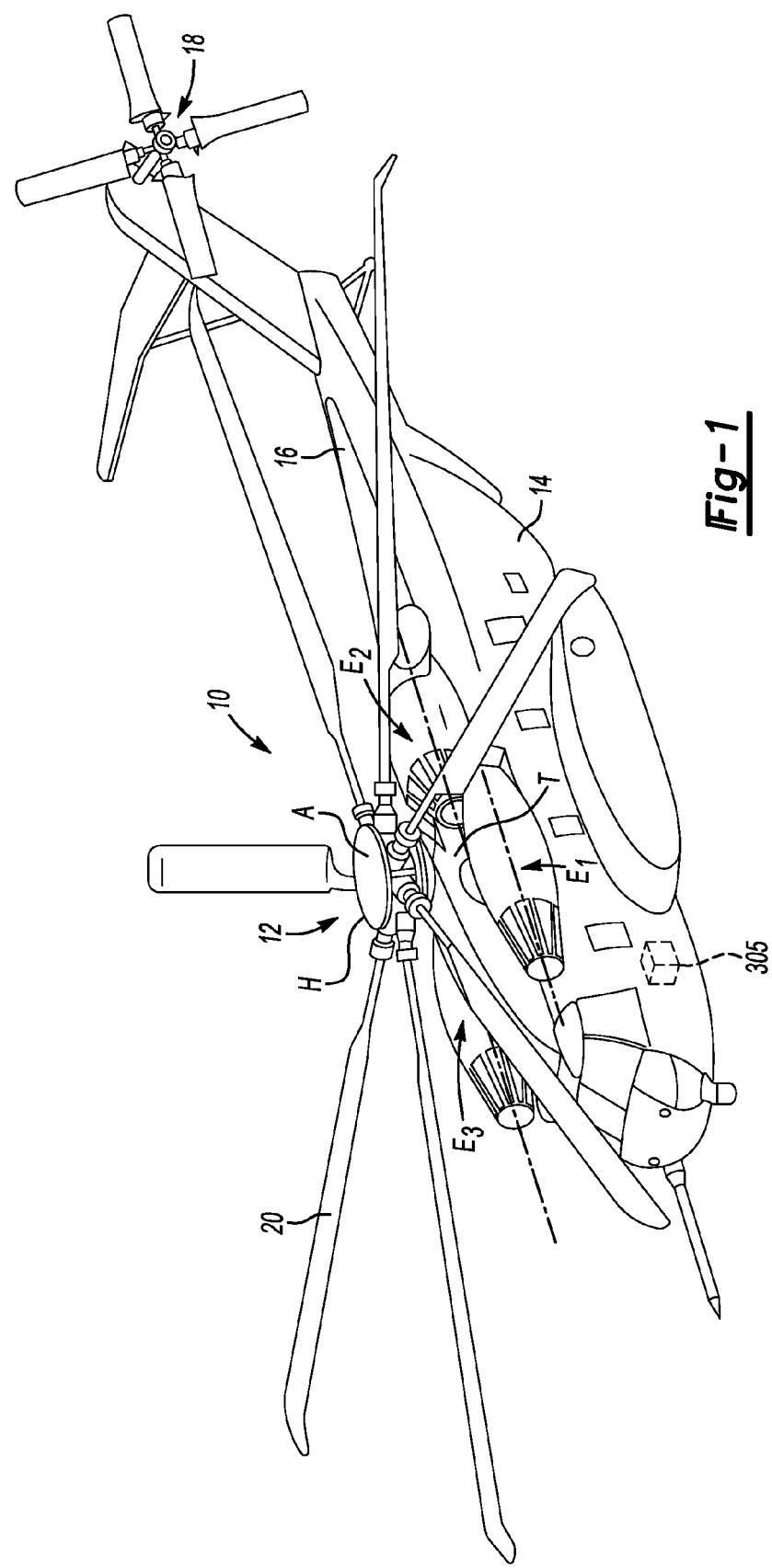
FIG. 1 shows a typical helicopter that includes an embodiment described herein.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, may also benefit from the present invention.

Figure 2:
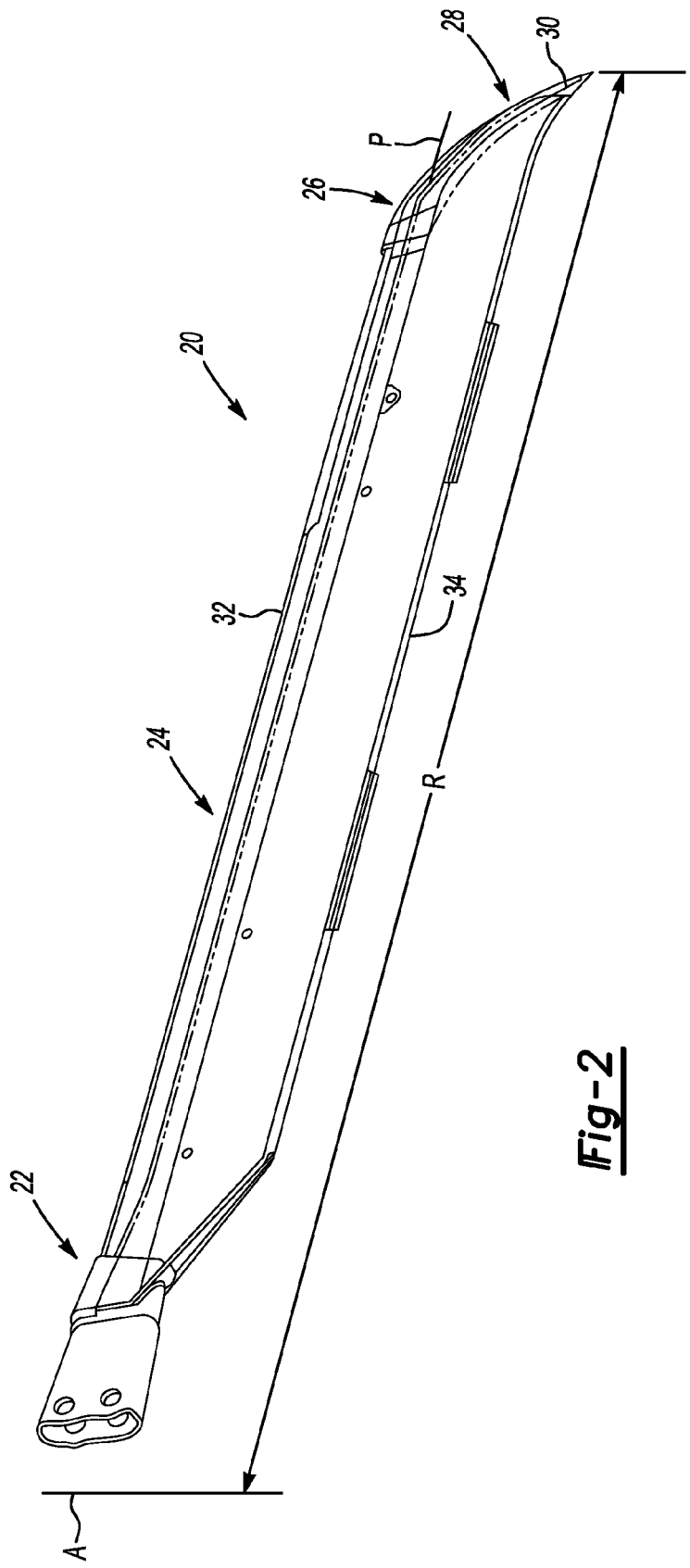
FIG. 2 shows an embodiment of a rotary wing of the helicopter of FIG. 1.

Referring to FIG. 2, each rotor blade assembly 20 of the rotor assembly 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 may include an anhedral form though any angled and non-angled forms such as cathedral, gull, bent, and other non-straight forms will benefit from the present invention.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length C.

Figure 3:
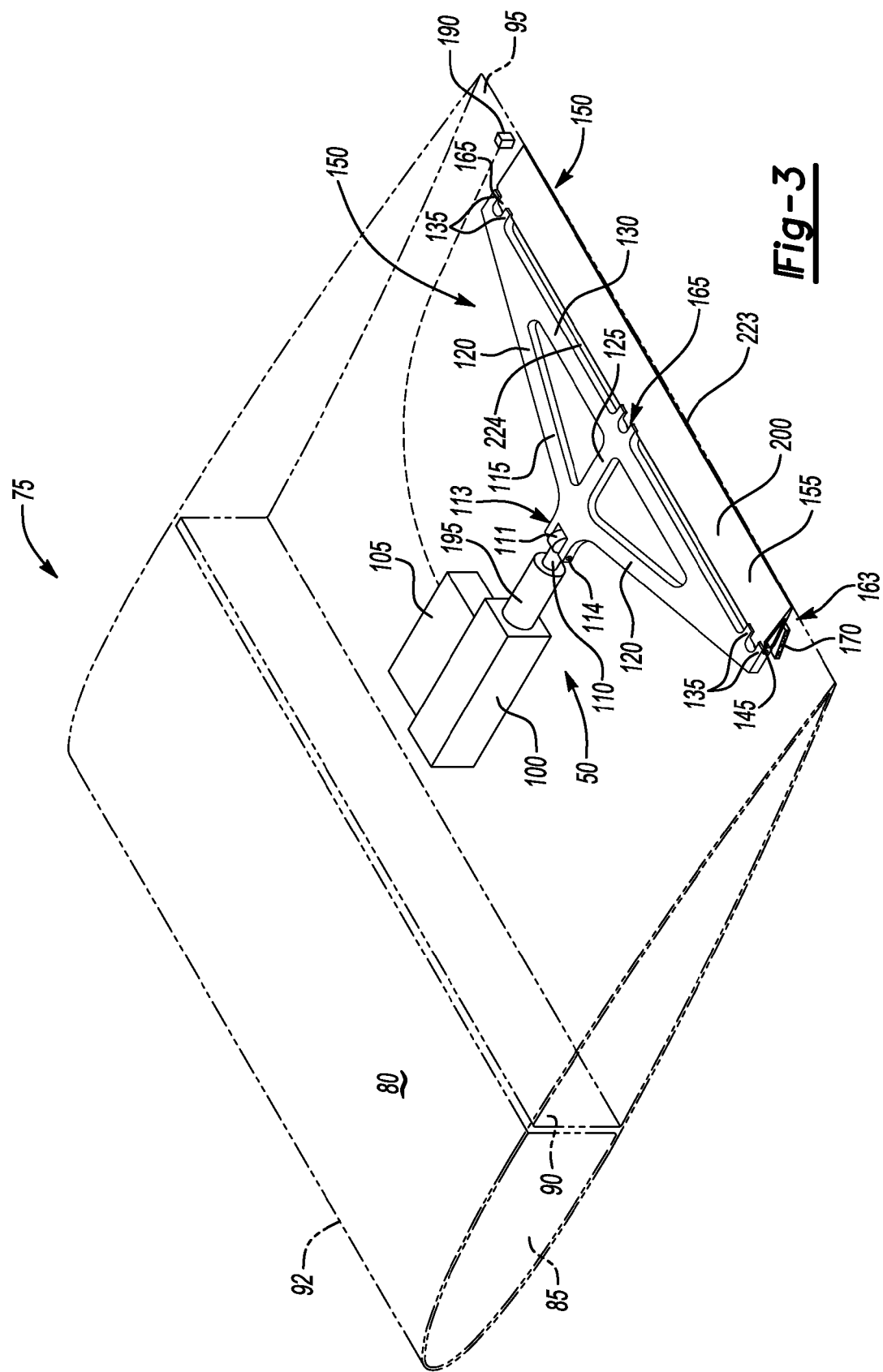
FIG. 3 shows a sectional view of the aircraft wing of FIG. 2 partially in phantom showing the gurney flap assembly.

Referring now to FIG. 3, a perspective view of a Gurney flap assembly 50 is shown. The helicopter wing 75 has a pressure side 85, a suction side 80, a support beam or spar 90, deposed between the pressure side 85 and the suction side 80, a leading edge 92 and a trailing edge 95.

The Gurney flap assembly 50 is disposed between the pressure side 85 and the suction side 80 aft of the support beam 90 and has an actuator 100, a controller 105 and an actuator output 110, such as a piston that is reciprocated by the actuator 100. The controller can be located in close proximity to the actuator 100 or located remotely from the actuator. The actuator output 110 has an eye end assembly 111 that fits within ears 113 of the yolk assembly 115 and is anchored thereto by a pin 114 that passes through the ears 113 and the eye end assembly 111.

The yolk assembly 115 has a pair of angled arms 120, a central support 125 that extends from the ears 113 through the angled arms 120 and attaches to a perpendicularly disposed bottom support 130. As shown in this embodiment, the bottom support 130 has three sets of bosses 135 through which a pin 145 grips a protrusion 165 of a Gurney flap 150.

The Gurney flap 150 has a flexible multi-portion body 155, as will be discussed infra. The Gurney flap 150 is disposed in a rectangular cutout 163 of the pressure side 85. A brush seal 170, or the like, is disposed at either end of the flexible multi-portion body 155 to minimize a passage of debris into a chamber 175 or hollow portion between the pressure side 85 and the suction side 80. Such debris might damage the actuator 100 or the controller 105 or the Gurney flap assembly 50.

Figure 4A:
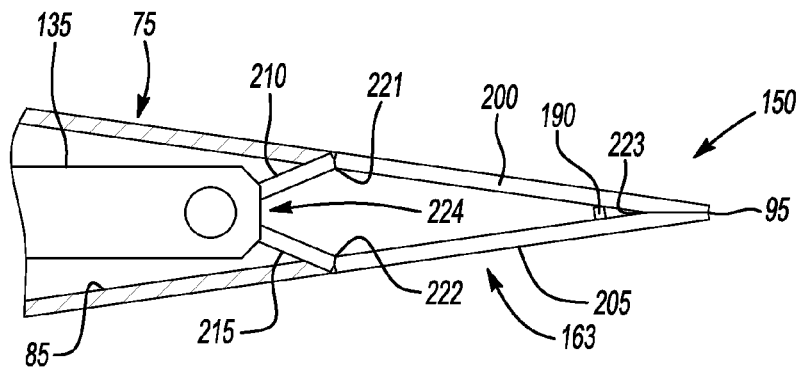
FIG. 4A shows a side view of the Gurney flap of FIG. 3 in a closed position.
Figure 4B:
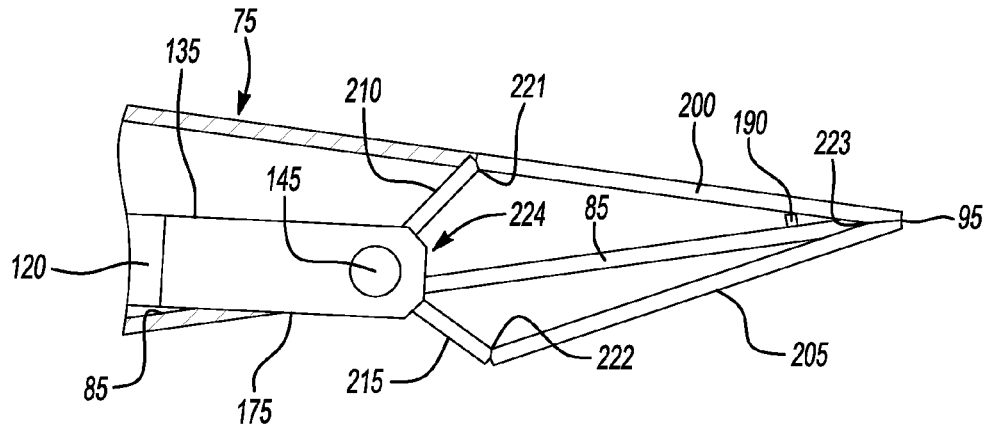
FIG. 4B shows a side view of the Gurney flap of FIG. 3 in a partially opened position.
Figure 4C:
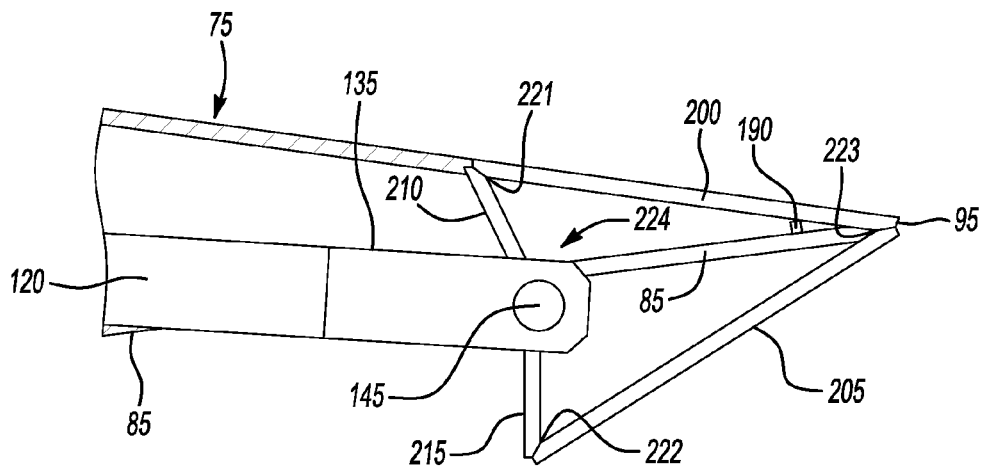
FIG. 4C shows a side view of a fully deployed Gurney flap of FIG. 3.

Referring to FIGS. 4A through 4C, an embodiment of the Gurney flap 150 is shown. The Gurney flap 150 fits in a cutout 175 in the pressure side 85 and the suction side 80. The Gurney flap 150 has the shape of a pen nib with a top upper portion 210; an angled portion 200 that is integral with and coplanar with the suction side 85 and that extends to the trailing edge 95 of the wing 75; a pressure side 205 that is shown to be coplanar with the pressure side in FIG. 4A and, a lower flap 215. The top upper portion 210, the angled portion 200, the pressure side 205 and the lower flap 215 may be referred to as panels. The Gurney flap has four live (i.e., flexible) joints (or hinges)—joint 221 connects the upper link portion 210 and angled portion 200, joint 222 connects the lower flap 215 and pressure side 205, joint 223 connects pressure side 205 and angled portion 200, and joint 224 connects lower flap 215 and top portion 210.

Referring now to FIG. 4B, the Gurney flap 150 is shown in a partially deployed position. The actuator 100 has moved the actuator output 110 forward to move the yoke assembly forward and downwardly as the ears 113 rotate about the pin 114. (see FIG. 3). The angled portion 210 rotates downwardly about joint 221 while lower flap 215 moves into the airstream as pin joint 224 separates the lower flap 215 and the top portion 210. Concomitantly, joint 222 tends to close and joint 223 tends to open caused by motion of the arms 120. Linear motion of the actuator output 110 is transposed to the active gurney flap, thereby causing the lower flap of the flap assembly to expand and deploy into the airstream on the pressure side of the wing.

As shown in FIG. 4C, the Gurney flap 150 is shown in a fully deployed position as the actuator output 110 of the actuator 100 continue to move forward. The angled portion 210 rotates past center about joint 221 while lower flap 215 moves into the airstream slightly past perpendicular to the pressure side 85 of the wing 75 as joint 224 continues to separate the lower flap 215 and the top portion 210. Concomitantly, joint 222 continues to close and joint 223 continues to open. While deploying, joint 224 has changed from an acute angle to an obtuse angle and joints 22 1and 222 have changed from an obtuse angle to an acute angle. While stowing (or retracting) the lower flap 215 into the wing 75, the Gurney flap 150 moves forward and upwardly, the joint 224 changes from an obtuse angle to an acute angle, and joints 221 and 222 change from an acute angle to an obtuse angle.

In an alternative embodiment, the angled portion 200 may be a portion of the wing 75 and the cutout 175 is only in the pressure side 85 of the wing 75. In such embodiment, top portion 210 and angled portion 200 are attached directly to the suction side 80.

A first position sensor 195 is placed around the actuator output 110 that informs the controller 105 as to the position of the lower flap 215 via the Gurney flap assembly 50. In addition, an optional second sensor 190, which communicates with the controller 105, is placed in close proximity to the edge of the lower flap 215. The second optional sensor 190 allows the controller to fine tune the position of the lower flap 215 should the wing encounter excessive bending or other moments and the second sensor provides a degree of redundancy should it or the first sensor 195 fail. The sensors 195, 190 (FIG. 3, respectively) in conjunction with the controller 105 permit the helicopter to rapidly modulate the position of the lower flap 215 to allow the helicopter wing 75 to provide a desired or even magnified mode of operation. The actuator 105 is designed to provide sinusoidal operation or full stowing/deployment with steady holding states between movements. For instance, if control is collective, a deployed lower flap 215 may allow a wing 75 to provide more lift relative to a wing without a deployed lower flap 215 and a stowed lower flap 215 has no effect on the functionality of the wing 75. If control is cyclic, the actuator 100, at the behest of the controller 105, may modulate the lower flap 215 inwardly and outwardly to match the cyclic action required of the wings and may even magnify the action of the wing 75 by providing more lift if the lower flap 215 is deployed. The controller may compare signals from the first sensor 195 and the second sensor 190 to test whether the lower flap 215 is actually in a desired position and may reset the yoke assembly 150 to place the lower flap 215 in a desired position. Similarly, a second controller 305 in the aircraft 10 may compare the output of controller 105 with the expected performance of the wing 75 or the aircraft 10 and direct the controller 105 to position the yoke assembly 115 to position the lower flap 215 so that wing 75 performance is met.

The flexible body multi-portion 155 (FIG. 3) and the lower flap 215 are made out of a flexible material such as a thin metal or a composite or the like. The thin metal or other composite is freely bendable to allow the actuator to move the Gurney flap 150 without affecting the surface of the wing 75. The flap edge stiffness may be enhanced by the addition of local reinforcing. Multiple gurney flaps can be incorporated into the blade span to provide redundancy.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gurney flap assembly, said flap assembly comprising:
   an actuator; and
   a body having,
   a leading edge and a trailing edge,
   a first panel attaching to said actuator proximate said leading edge,
   a second panel attaching to a first hinge at said trailing edge, and
   a second hinge attaching said first and second panel.

2. The assembly of claim 1 wherein said first hinge and said second hinge are living hinges.

3. The assembly of claim 1 further comprising:
   a third panel attaching to a third hinge that attaches to the first panel in proximity of the actuator.

4. The assembly of claim 3 wherein said third hinge is a living hinge.

5. The assembly of claim 3 further comprising:
   a fourth panel attaching to said third panel via a fourth hinge.

6. The assembly of claim 5 wherein said fourth hinge is a living hinge.

7. The assembly of claim 5 wherein said fourth panel attaches to said second panel via said first hinge.

8. The assembly of claim 1 wherein said second hinge moves from an obtuse angle to an acute angle as said first panel moves from a stowed position to a deployed position.

9. The assembly of claim 1 wherein said first and second panels are flexible.

10. A gurney flap assembly for a rotary wing aircraft comprising:
- a wing having a pressure side, a suction side, a trailing edge and a hollow portion between said pressure side and said suction side and adjacent said trailing edge,
- an actuator disposed within said hollow portion of said wing, and
- a body having,
- a forward edge and an aft edge,
- a first panel attaching to said actuator proximate said forward edge,
- a second panel attaching to said aft edge, and
- a first hinge attaching said first and second panel,
- wherein said second panel flexes and said first hinge rotates in reaction to motion of said actuator.

11. The assembly of claim 10 wherein said first hinge is a living hinge.

12. The assembly of claim 10 further comprising:
- a third panel attaching to a second hinge that attaches to the first panel in proximity of the actuator and attaching to the suction side.

13. The assembly of claim 12 wherein said second hinge moves from an acute angle to an obtuse angle as said first panel moves from a stowed position to a deployed position.

14. The assembly of claim 12 wherein said second hinge is a living hinge.

15. The assembly of claim 12 wherein said third panel is flexible and bends if said actuator moves.

16. The assembly of claim 12 further comprising:
- a fourth panel attaching to said third panel via a third hinge.

17. The assembly of claim 15 wherein said fourth hinge is a living hinge.

18. The assembly of claim 15 wherein said fourth panel attaches to said second panel via a fourth hinge.

19. The assembly of claim 10 wherein said first hinge moves from an obtuse angle to an acute angle as said first panel moves from a stowed position to a deployed position.

20. The assembly of claim 10 wherein said aft edge is at said trailing edge.

* * * * *